No. 756,227. PATENTED APR. 5, 1904.
C. H. FISK.
LAWN SHEARS.
APPLICATION FILED JUNE 22, 1903.
NO MODEL.
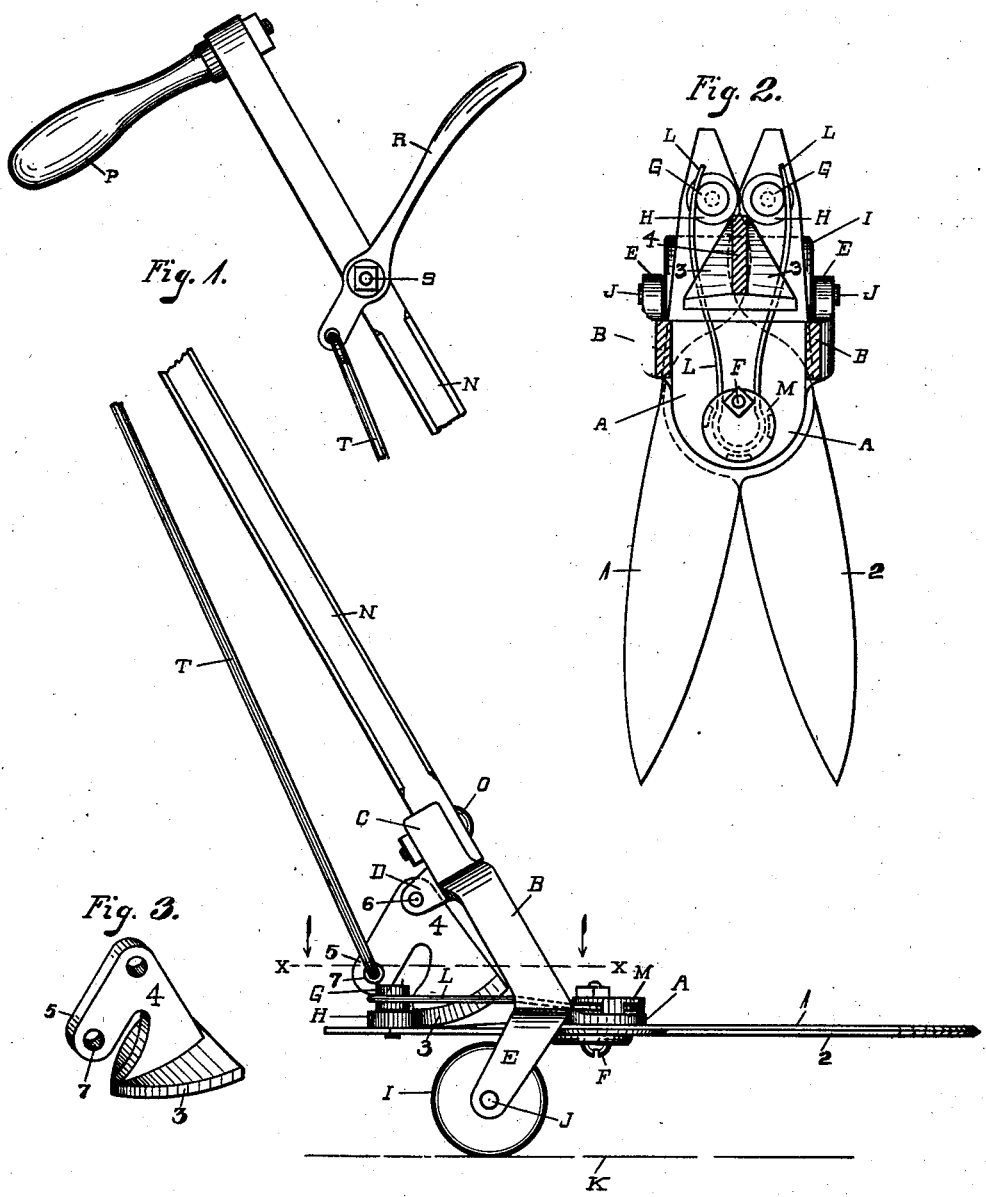
WITNESSES:
C. H. FISK.
INVENTOR.
BY
ATTORNEY.

No. 756,227.

Patented April 5, 1904.

UNITED STATES PATENT OFFICE.

CHARLES H. FISK, OF RICHMOND, INDIANA, ASSIGNOR TO THE FIRM OF FISK & JAY.

LAWN-SHEARS.

SPECIFICATION forming part of Letters Patent No. 756,227, dated April 5, 1904.

Application filed June 22, 1903. Serial No. 162,480. (No model.)

*To all whom it may concern:*

Be it known that I, CHARLES H. FISK, a citizen of the United States, residing in the city of Richmond, in the county of Wayne, and in the State of Indiana, have invented new and useful Improvements in Lawn-Shears, of which the following is an accurate specification, which when taken in connection with the accompanying drawings, forming a part thereof, is sufficiently clear and concise as to enable others skilled in the art to which it appertains to make and use the same.

My present invention contemplates a radical reconstruction of the constituent elements of devices of this character combined with new devices and operations and mechanical elements, the adoption of old principles with the mechanical elements and operations thereof reduced to their simplest propositions, and as a natural sequence accentuating the utilitarian residual benefits and adopting them to subserve the highest economic ends.

The simplicity of my invention, together with its positiveness of action and effectiveness and efficiency of the resultant operations, will appeal to any one familiar with the management or manufacture of devices of this character, and while I am aware that devices of a somewhat similar general character have been constructed, yet in my opinion they all more or less lack that positiveness of action and adaptation and intermutual relationship of the several elements which should characterize devices of this kind, and in my opinion the crux of the whole matter lies more particularly in what has heretofore been the inability of providing simple, positive, and efficient means for moving the cutting-blades to produce commensurate results in a simple and positive manner. This trouble I have effectually overcome in the construction herein shown and described.

In this invention my object, broadly speaking, is the provision of an improved mechanism in lawn-shears, in which a maximum of mechanical energetic efficiency will be developed with a minimum of power applied and at the same time provide a mechanism composed of a minimum of mechanical parts which will be neat, artistic, and attractive in appearance, compact and symmetrical in proportions, strong and durable in construction, positive in action, and which can be manufactured and sold at a comparatively low price.

Still another object, generically speaking, is to provide improvements in lawn-shears which involve simplicity of construction and operation, whereby the operator will be enabled to control its operations that its work may be performed with certainty and precision.

Another object is the provision of mercable lawn-shears which will be simple in character, composed of a minimum amount of material, in which the parts may easily and quickly be formed and assembled, and which will be easily operated and controlled.

One of the specific objects is the provision of a roller-bearing actuating-cam for the blades of the shears and other specific devices which will appear in the following specification.

Other objects and advantages will appear from the following description, by reference to the drawings, and as correlated in the claims hereunto appended.

My invention consists in lawn-shears embodying new and useful features and details of construction and relative disposition of the several parts, substantially as particularly described hereinafter and in the legitimate combinations herein set forth.

One manner of carrying out my invention and that which in practice has been found the most desirable is illustrated in the accompanying drawings, in which—

Figure 1 is a side elevation of my invention in full, the handle and connecting-rod being divided in order to show the invention on a larger scale than would otherwise be possible. Fig. 2 is a top plan of the lower portion of the invention, taken on the line X X of Fig. 1. Fig. 3 is a detail isometrical view of my actuating-cam.

Similar indices refer to and denote like parts throughout the several views.

With the above-named views in mind I will now take up the description of my invention in detail, which I will refer to as briefly and compactly as I may.

The basic portion of my invention consists of a casting, consisting of the relatively horizontal portion A, with a straight-line rear edge and half-circle forward edge, as shown in Fig. 2. Extending upward and rearward from the sides of the portion A are the two arm portions B B, which portions unite at their upper ends by the socket portion C. Extending rearward from the lower part of the socket portion C is a double hanger D, with oppositely-disposed horizontal apertures therethrough, and extending slightly outward and thence downwardly and slightly rearward are the hangers E E, with oppositely-disposed horizontal apertures through their lower ends. All of said parts A, B, C, D, and E are integral of each other, forming a single casting of the form shown. Through the central forward part of the portion A is a vertical aperture for the king-bolt F, which latter has a lower rounded head and threaded upper end provided with a nut, as shown in Figs. 1 and 2.

The numerals 1 and 2 represent two corresponding acuminate blades crossing each other near their centers, with corresponding apertures therethrough to receive the king-bolt F, by which said blades are pivoted together and to the under side of the portion A of said casting, as shown in Figs. 1 and 2. The forward contacting edges of the blades are sharpened substantially as in ordinary shears, with the extreme ends terminating substantially as shown in the drawings. Through the rear portions of the blades 1 and 2 are vertical apertures to receive the studs G, said studs having comparatively large heads on their upper ends, with stem portions of smaller diameter to fit in said apertures on their lower portions.

The letters H H represent two rollers with central openings therethrough in the axial direction to receive the stems of the studs G, the attachment being accomplished by inserting the stems of the studs G through said rollers and then inserting said stems in the apertures in the rear portions of the blades 1 and 2 and then riveting said stems on the under side of the blades, whereby the studs are held securely, while the rollers are free to revolve on the stems thereof in substantially the positions shown in Figs. 1 and 2.

Located between the hangers E E is a ground-roller I, revolubly mounted on the shaft J, which latter is secured at each end in said apertures at the lower portions of the hangers E E, said roller I being adapted to travel on the ground-line K, as shown.

The letter L denotes a single two-arm spring looped at its forward end around the king-bolt F and resting on the portion A of the main casting, in which position it is secured by the cap-plate M, through which plate passes the king-bolt F, with lugs extending down from said plate only slightly more than the diameter of said spring, by which the plate may be tightly contacted with the upper face of the portion A, at same time allowing the free action of the spring L. The rear ends of the spring L engage the outer sides of the heads of the studs G just above the rollers H H, said spring being of a resiliency to normally retain the rear ends of the blades together, and consequently the forward ends of the blades apart, as in Fig. 2.

The actuating-cam, as shown in Fig. 3, consists of a triangular substantially horizontal flat wedge portion 3, with an upwardly-extending hanger portion 4, with a horizontal opening through its upper portion, and the operative portion 5 extending downward and rearward from the portion 4, with an eye 7 through its lower part, as shown. The thickness of the portion 4 is only slightly less than the space in the two-part hanger D, in which it is pivoted by the pin 6, as shown in Fig. 1, the location being such that the wedge portion 3 may be swung backward with its under surface only slightly above the blades 1 and 2.

The handle N is secured at its lower end in the socket of the portion C by the bolt O and in alinement with the arm portions B, as shown in Fig. 1. The upper end of the handle N is provided with a rearwardly-extending hand-hold P, below which a lever R is fulcrumed to one side of the handle N by the bolt S passing therethrough, as shown in Fig. 1. The connecting-rod T is mounted at its upper end in an eye in the point of the lever R and its lower end is mounted in the eye 7 of the cam, as shown in Fig. 1.

Operation: It will now be seen that the device may be managed by grasping the handhold P with one hand and managing the lever R with the other hand and that the device may be moved over the ground on its roller I to bring the device to or from its work. The lever R being up to its highest point, the blades 1 and 2 will be apart, as in Fig. 2. Then by pressing down on the lever R the rod T will raise the rear part 5 of the cam, causing the point of the triangular portion 3 to enter between the two rollers H H, spreading them apart, consequently spreading apart the rear ends of the blades, and therefore bringing the cutting edges of the blades together and overlapping each other, as in ordinary shears, by which grass or weeds which may be between the forward portions of the reciprocating blades will be severed thereby as the blades are closed together, and when the lever R is released the spring L will quickly bring the rear ends of the blades together, opening the forward ends thereof, and thus returning the mechanism to its normal static position ready for a new bite.

By the employment of the construction above described it will be manifest that grass, weeds, or the like may be cut along lawn edges, along fences, around plants and shrubbery, and in angulous places where it would be impossible to do the work with an ordinary lawn-mower.

From the above description, taken in connection with the accompanying drawings, it will be seen that I have produced an improved construction in lawn-shears embodying the objects otherwheres referred to in this specification and other objects not alluded to.

While I have illustrated and described the best means now known to me for carrying out my invention, I wish it to be understood that I do not restrict myself to the exact details of construction shown and described, but hold that any slight changes or variations in such details as would suggest themselves to the ordinary mechanic would clearly fall within the limit and scope of my invention.

Having now fully shown and described my invention, what I claim, and desire to secure by Letters Patent of the United States, is—

1. In combination with a main casting carrying an upward and rearward extending handle, a ground-roller, and a pair of reciprocating blades crossing each other near their centers and pivoted to the under side of the main casting by a king-bolt, of a stud extending up from the rear of each of the blades, a roller mounted on each of said studs, a spring secured by a plate around said king-bolt and engaging said studs to hold the rear ends of said blades together, a swinging wedge-cam mounted in hangers to said main casting, a rod extending up from said cam to a lever pivoted to the handle whereby said lever may be operated to cause said cam to engage said rollers and spread the rear ends of said blades apart, all substantially as shown and described and for the purposes set forth.

2. In combination with a main casting having a relatively long handle, a pair of cutting-blades having rearwardly-extending portions pivotally mounted on the under side of said casting, a roller mounted on the upper surface of each of said rear portions of the blades, a swinging cam having a substantially horizontal portion adapted to spread the rear portions of the blades apart, a spring for normally holding the rear portion of said blades together, and a rod connected to said cam and to a lever near the upper end of the handle for operating said cam to close the forward portions of the blades, all substantially as described.

3. In combination with lawn-shears having a main casting, a ground-roller, and a relatively long handle, of the actuating-cam consisting of a triangular substantially horizontal portion, an upwardly-extending hanger portion, and a downwardly-extending operating portion, means for mounting the cam to the main casting, means for operating the cam from near the top of the handle, a pair of reciprocating cutting-blades pivotally mounted to the under side of said main casting having forwardly-extending cutting portions and rearwardly-extending portions, studs secured to the said rear portions of the blades, and rollers mounted on said studs, all substantially as set forth and shown.

4. A lawn-shearing mechanism, the combination, of a basic casting having a horizontal portion, a pair of reciprocating cutting-blades pivotally mounted to the under side of said horizontal portion having forwardly-extending cutting portions and rearwardly-extending portions, studs secured in the rear portions, rollers mounted on said studs, hangers extending down from said horizontal portions with an axle uniting their lower portions having a ground-roller mounted therein between said hangers, arms extending up from said horizontal portion terminating in a socket portion, a handle secured to said socket portion, a pair of hangers extending rearward from said socket portion, an actuating-cam mounted between said hangers, said cam having a triangular portion adapted to form a wedge between said rollers on the rear of the blades, and a connecting-rod extending from said cam to a lever near the upper end of said handle, substantially as shown and described.

In testimony whereof I have hereunto signed this specification in the presence of two subscribing witnesses.

CHARLES H. FISK.

Witnesses:
R. W. RANDLE,
R. E. RANDLE.